March 25, 1952 M. B. SAWYER, SR 2,590,726
ORCHARD OR LAWN SPRINKLER

Filed Jan. 10, 1949 2 SHEETS—SHEET 1

WITNESSED
BY Raymond E Karp
BY J Eugene Hawkins

INVENTOR:
Marion B. Sawyer Sr.

March 25, 1952 M. B. SAWYER, SR 2,590,726
ORCHARD OR LAWN SPRINKLER
Filed Jan. 10, 1949 2 SHEETS—SHEET 2
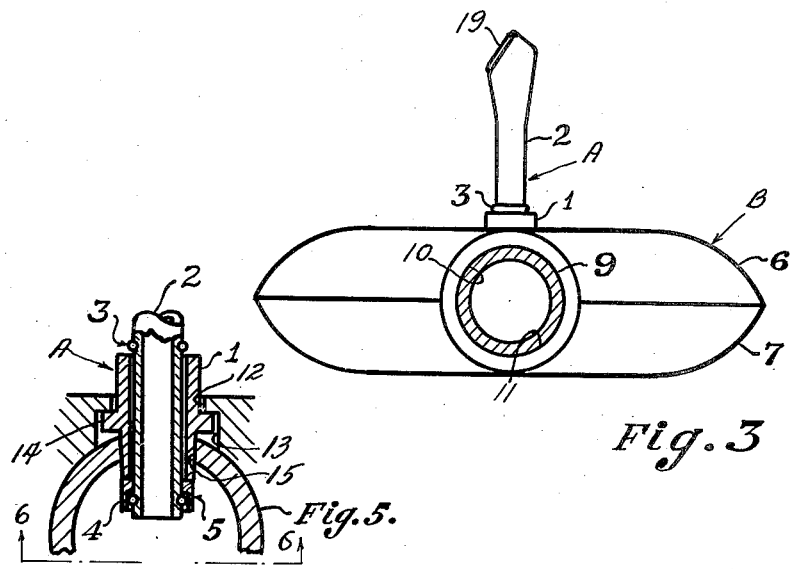
Fig. 3
Fig. 5.
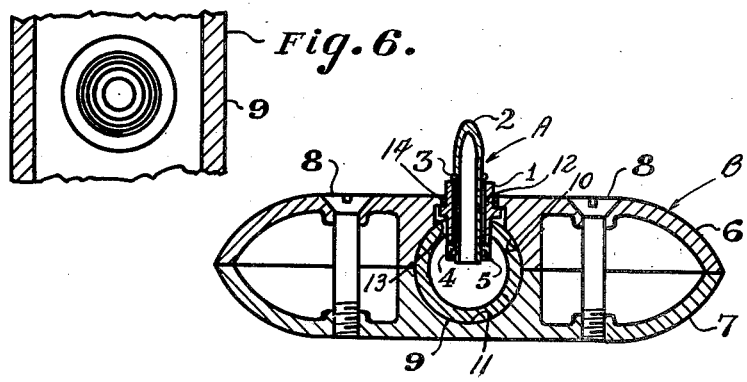
Fig. 6.
Fig. 4.
WITNESSED
BY Raymond S Karp
BY J Eugene Hawkins
INVENTOR.
Mason B. Sawyer Sr.

Patented Mar. 25, 1952

2,590,726

UNITED STATES PATENT OFFICE 2,590,726

ORCHARD OR LAWN SPRINKLER

Marion B. Sawyer, Sr., Whittier, Calif.

Application January 10, 1949, Serial No. 69,991

6 Claims. (Cl. 299—105)

My invention relates to orchard or lawn sprinklers, and has particular reference to a sprinkler for attachment to a flexible hose at a point intermediate the ends thereof so as to permit a plurality of such sprinklers to be attached to a single length of hose in substantially any desired spaced relation to each other.

In the irrigation of certain types of crops, and in the watering of lawns, it is often preferable to apply the water from above in the form of a shower or spray simulating natural rainfall. In many cases a permanent installation of the required number of sprinkling devices over the entire area to be served is not feasible because of the great cost and the difficulties of cultivation and harvesting. In such cases, recourse has been had in the past to portable sprinkler sets permitting the sprinklers to be removed from the area for harvesting, mowing, or cultivation, and allowing the sprinklers to be moved from place to place so that the entire area may be watered by the use of a smaller amount of equipment than would be required for a permanent installation.

For such portable use a flexible hose is ordinarily preferred over rigid pipe as the conduit for conveying the irrigation water to the sprinkler, as this facilitates movement of the sprinkler sets from one location to another, and also permits adjustment of the positioning of the individual sprinklers. In such devices, it is common to connect a substantial number of individual sprinkling devices in series to form a single run so that larger areas can be watered than would be possible with a single sprinkler.

The devices used prior to this invention for such irrigation required the use of a number of individual hose sections fitted on each end with the usual screw fittings or hose-type couplings which were in turn attached to the individual sprinkler units. Certain disadvantages are inherent in such an arrangement in that the cost of the installation is materially increased by the additional cost of the relatively large number of fittings and hose connections required. The use of a multiplicity of such connections or couplings correspondingly increases the cost of maintenance. Likewise, the corresponding increase in the weight of the entire assembly makes the assembled arrangement much more difficult and cumbersome to move from place to place.

Furthermore, the sprinkler devices used prior to this invention were of relatively complicated and expensive construction, or alternatively, provided a non-uniform distribution of the precipitation over the area served, thus defeating one of the objects sought to be attained by the use of such a system of irrigation.

It is therefore an object of my invention to provide a sprinkler which is particularly adapted to the attachment of a plurality of such sprinklers in spaced relation along a single continuous length of flexible hose, and which overcomes the above-mentioned disadvantages of the sprinkler devices known prior to this invention.

It is also an object of my invention to provide a sprinkler of the character set forth in the preceding paragraph which includes a water-distributing sprinkler device carried by a split base member arranged to be clamped around the flexible hose at any desired point intermediate the ends thereof and provide a fluid intercommunication between the hose and the sprinkler device through a hole previously cut in the wall of the hose, and without the use of hose connections or couplings of any kind.

It is another object of my invention to provide a sprinkler of the character hereinbefore mentioned in which the water-distributing sprinkler device comprises a bent tubular arm fitted on the discharge end with a deflector for breaking up the issuing stream to provide uniform precipitation over the area covered, and for producing a torque tending to rotate the arm, the arm being journaled for such rotation in a water-lubricated bearing of novel construction.

It is an additional object of my invention to provide a sprinkler of the character hereinbefore described which is of simple and inexpensive construction not likely to get out of order and arranged for ready and simple attachment to the hose without the use of special tools or equipment.

Other objects and advantages of my invention will be apparent from a consideration of the following specification, read in connection with the accompanying drawings, wherein:

Fig. 3 is an end elevational view of the apparatus shown in Fig. 1;

Fig. 4 is a cross-sectional view taken substantially along the line 4—4 of Fig. 1;

Fig. 5 is a fragmentary sectional view taken on the same plane as Fig. 4, but illustrating to a larger scale the details of construction of the sprinkler element and its manner of cooperation with the base member portion of the device and with the flexible hose; and Fig. 6 is an underside view taken as indicated by the line 6—6 of Fig. 5.

Figure 1:
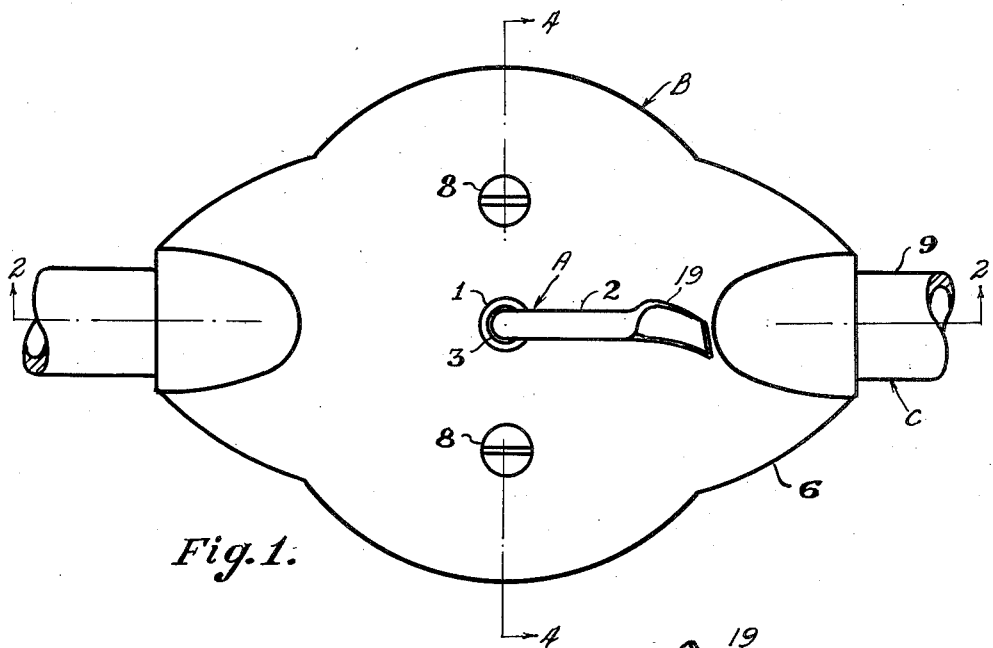
Fig. 1 is a plan view of a sprinkler unit constructed in accordance with my invention and secured to a length of flexible hose intermediate the ends thereof.

Referring to the drawings wherein is illustrated one form my invention may take, the lawn or orchard sprinkler of my invention comprises a water-distributing sprinkler device indicated generally by the reference character A, carried by a base structure indicated generally by the reference character B, the base structure B being arranged to be clamped around a length of flexible hose such as is indicated at C at a point intermediate the ends of such length of hose. As will become clear, the parts are arranged to provide an intercommunication between the sprinkler device A and the interior of the hose C through an aperture or opening cut in the wall of the hose C prior to the attachment of the sprinkler to the hose. The device is so arranged as to prevent leakage of fluid once the device is properly installed.

The sprinkler device A comprises a bushing 1 which serves as a water-lubricated bearing to support for rotation about its longitudinal axis a vertically extending journal portion of a bent tubular arm 2 through which the water is discharged during the operation of the sprinkler.

As is best shown in Fig. 5, the lower open end of the journal portion extends below the lower end of the bushing 1 to receive a thrust collar 5 which is held in place by means of a snap ring 4 fitted in a suitable snap ring groove. A similar snap ring 3 is applied to the journal portion immediately above the upper end of the bushing 1 to prevent the tubular arm from moving downwardly through the bushing 1. Thus, the tubular arm 2 is journaled for rotation in the bushing 1 and is held against axial movement relative thereto by the snap rings 3 and 4 and the thrust collar 5, the thrust collar 5 serving to act as a thrust bearing and minimize the frictional resistance to turning attendant upon the tendency of the tubular arm 2 to move upwardly in the bushing 1 during the operation of the sprinkler.

As is best seen in Figs. 3 and 4, the base member B is formed of separable halves 6 and 7 which are grooved along their mating faces as indicated at 10 and 11 to define a hose-receiving channel when the halves are placed in face-to-face relation, as shown in Fig. 4. The hose-receiving channel is of the same shape and substantially the same cross-sectional area as that of the section 9 of the hose C to which the device is to be attached, such cross-sectional shape ordinarily and preferably being circular. By making the cross-sectional area of the hose-receiving channel substantially equal to or slightly smaller than the cross-sectional area of the section 9 of the hose C, the base structure may be securely clamped to the hose by clamping the two halves 6 and 7 to each other.

The two separable halves 6 and 7 of the base structure B may be clamped around the hose 9 in the manner shown by any suitable clamping mechanism such as, for example, screws 8 which pass through clearance holes in one base half 6 and are threadedly engaged in suitably tapped holes provided in the other base half 7.

The upper base half 6 is provided with an aperture 12 for receiving the bushing 1 which may be secured in the aperture 12 in any suitable fashion. For example, the aperture 12 may be counterbored as indicated at 13 to receive a radial flange 14 formed on the bushing member 1. The engagement of the flange 14 with the radial surface provided by the counterbore 13 prevents upward movement of the bushing 1, downward movement of the bushing 1 being prevented by the hose portion 9 which is clamped between the two halves 6 and 7.

Before the base structure is clamped about the hose 9, the hose is suitably cut or drilled to provide an opening 15 in the wall thereof so that the base structure may be clamped to the hose with the aperture 12 in substantial alignment with the opening 15. Preferably, the parts are so proportioned as to permit the lower portion of the bushing 1 to be received within the opening 15 in the manner illustrated in Figs. 2, 4, and 5, and in order to minimize leakage, the opening 15 is preferably cut to a slightly smaller diameter than the outside diameter of that portion of the bushing 1 which is inserted into the opening 15.

The device is most easily assembled by first assembling, in the manner illustrated and described, the components parts of the water-distributing sprinkler device A. The bushing 1 is then inserted into the opening 15 and the upper base half 6 is then threaded over the tubular arm 2 by passing the same through the aperture 12 and moving the base half 6 to the position shown in the drawings. The lower base half 7 is then placed in position, and the two base halves 6 and 7 are securely clamped to each other by means of the clamping means 8.

Since a complete fluid seal may not be achieved between the bushing 1 and the walls of the hose 9 surrounding the opening 15, either by reason of irregularities in the opening 15 as cut in the resilient material of the hose 9 or by reason of the proportioning of the parts in such manner that the bushing 1 does not enter the opening 15, it is desirable to provide within the hose-receiving channel as a part of the base structure means for preventing fluid leakage between the walls of the hose and the walls of the channel. To this end I provide on the base halves 6 and 7, and extending into the channel defined by the grooves 10 and 11, annular clamp means in the form of pressure lands 16, 17, and 18 for applying at those locations substantial clamping pressures about the entire periphery of the hose. The central land 17 is preferably in alignment with the aperture 12 so as to secure a firm pressure engagement between the base halves 6 and 7 and the hose 9 in the immediate vicinity of the aperture 12.

Figure 2:
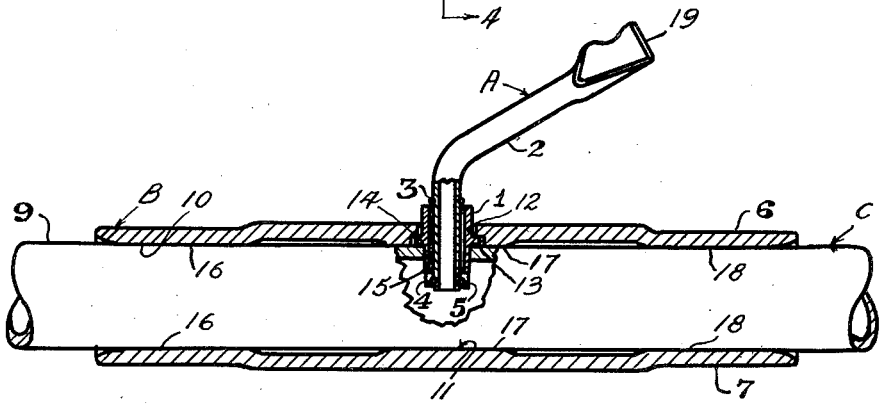
Fig. 2 is a longitudinal sectional view taken substantially along the line 2—2 of Fig. 1.

The outer end of the bent tubular arm 2 is fitted with a deflector 19 of the form and shape indicated by Figs. 1, 2, and 3 of the drawings. This deflector is positioned to intercept all or a part of the stream of water issuing from the end of the bent tubular arm 2, and serves to deflect the stream and break the same into drops so as to distribute the water uniformly over the area served by the sprinkler. At the same time, the deflection of the water produces a torque resulting in the rapid rotation of the tubular arm 2 about the vertical longitudinal axis of the journal portion thereof. I have found that a deflector 19 of the shape and form illustrated in the drawings may quite easily be adjusted in its position on the end of the arm 2 to provide a substantially uniform distribution of the water over the entire area covered by the shower of drops so produced.

While I have illustrated and described herein one embodiment of my invention, I do not desire to be limited to the details of construction illustrated and described, except as defined in the appended claims.

I claim:

1. In a sprinkler for connection to a flexible hose at a point intermediate the ends thereof, the combination of: a base member formed of separable halves and defining a tubular channel for receiving an encompassing said hose; clamping means for drawing said halves together to clamp said hose in said channel, said hose having an opening through the wall thereof within said channel; a rotating tubular arm including a journal portion and a discharge portion comprising an angularly disposed extension of said journal portion; bearing means secured to one of said halves in a position overlying said opening in said hose and supporting said journal portion for rotation about the longitudinal axis thereof; and sealing means on said bearing means for entering said opening and forceably engaging the wall of said hose surrounding said opening to provide a seal for preventing leakage of fluid from said hose.

2. In a sprinkler for connection to a flexible hose at a point intermediate the ends thereof, the combination of: a base member formed of separable halves and defining a tubular channel for receiving and encompassing said hose; clamping means for drawing said halves together to clamp said hose in said channel, said hose having an opening through the wall thereof within said channel; a rotating tubular arm including a journal portion and a discharge portion comprising an angularly disposed extension of said journal portion; bearing means secured to one of said halves in a position overlying said opening in said hose and supporting said journal portion for rotation about the longitudinal axis thereof; sealing means on said bearing means for entering said opening and forceably engaging the wall of said hose surrounding said opening to provide a seal for preventing leakage of fluid from said hose; and annular clamp means on said halves within said channel surrounding said hose on opposite sides of said opening for preventing leakage of fluid between said hose and the walls of said channel.

3. In a sprinkler for connection to a flexible hose at a point intermediate the ends thereof, said hose having an opening through the wall thereof at said point, the combination of: a base member formed of separable halves and defining a tubular channel for receiving and encompassing said hose, one of said halves having an aperture therethrough communicating with said channel; clamping means for drawing said halves together to clamp said hose in said channel in a position substantially aligning said opening with said aperture; a rotating tubular arm including a journal portion and a discharge portion, said discharge portion comprising an angularly disposed extension of said journal portion; and bearing means secured in said aperture for supporting said journal portion for rotation about the longitudinal axis thereof, said bearing means surrounding said journal portion above the lower open end thereof, whereby fluid may pass from said hose into said tubular arm.

4. In a sprinkler for connection to a flexible hose at a point intermediate the ends thereof, said hose having an opening through the wall thereof at said point, the combination of: a base member formed at separable halves and defining a tubular channel for receiving and completely encircling said hose at said point, said channel having substantially the same cross-sectional shape and area as said hose, one of said halves having an aperture therethrough communicating with said channel; clamping means for drawing said halves together to clamp said hose in said channel in a position substantially aligning said opening with said aperture and for bringing the walls of said channel into pressure engagement with said hose to prevent fluid leakage; a rotating tubular arm including a journal portion and a discharge portion, said discharge portion comprising an angularly disposed extension of said journal portion; bearing means in said aperture surrounding said journal portion at a point above the lower open end and thereof for supporting said journal portion for rotation about the longitudinal axis thereof; a thrust collar surrounding the lower end of said journal portion in a position to engage the lower end of said bearing means to prevent upward movement of said journal portion through said bearing means; and a deflector element secured to the outer end of said discharge portion for distributing fluid discharged therefrom and for propelling said tubular arm in rotation about the axis of said journal portion.

5. In a sprinkler for connection to a flexible hose at a point intermediate the ends thereof, said hose having an opening through the wall thereof at said point, the combination of: a base member formed of separable halves and defining a tubular channel for receiving and completely encircling said hose at said point, said channel having substantially the same cross-sectional shape and area as said hose, one of said halves having an aperture therethrough communicating with said channel; clamping means for drawing said halves together to clamp said hose in said channel in a position substantially aligning said opening with said aperture and for bringing the walls of said channel into pressure engagement with said hose around the complete periphery thereof to prevent leakage of fluid between said walls and said hose; a fluid distributing sprinkler device including a fluid passage; and a tubular bushing in said aperture for connecting said device to said one half with said fluid passage in communication with the interior of said hose, whereby fluid may pass from said hose to said device without leakage.

6. In a sprinkler for connection to a flexible hose at a point intermediate the ends thereof, said hose having an opening through the wall thereof at said point, the combination of: a base member formed of separable halves and defining a tubular channel for receiving and completely encompassing said hose, one of said halves having an aperture therethrough communicating with said channel; clamping means for drawing said halves together to clamp said hose in said channel in a position substantially aligning said opening with said aperture; a fluid distributing sprinkler device including a fluid passage; a tubular bushing in said aperture connecting said device to said one half with said fluid passage in communication with the interior of said hose; and annular clamp means on said halves within said channel surrounding said hose on opposite sides of said opening and in pressure engagement with said hose for preventing leakage of fluid between said hose and the walls of said channel, whereby fluid may pass from said hose to said sprinkler device without leakage.

MARION B. SAWYER, Sr.

(References on following page)

REFERENCES CITED

The following references are of record in the file of this patent:

UNITED STATES PATENTS

| Number | Name | Date |
|---|---|---|
| 390,427 | Woolsey | Oct. 2, 1888 |
| 455,151 | Bartlett | June 30, 1891 |
| 733,334 | Seaman | July 7, 1903 |
| 963,944 | Saltlamachia | July 12, 1910 |
| 1,430,620 | Brauer | Oct. 3, 1922 |
| 1,598,352 | Kehoe, Jr. et al. | Aug. 21, 1926 |
| 1,840,721 | Ingram | Jan 12, 1932 |
| 1,938,837 | Ittner | Dec. 12, 1933 |
| 2,196,456 | Charroin | Apr. 9, 1940 |
| 2,273,401 | Ferrando et al. | Feb. 17, 1942 |
| 2,323,701 | Barksdale | July 6, 1943 |
| 2,529,262 | Ratliff | Nov. 7, 1950 |